United States Patent [19]

Nett

[11] Patent Number: 4,798,939
[45] Date of Patent: Jan. 17, 1989

[54] PRESSURIZED LIQUID COOKER WITH INTEGRATED RADIANT HEATING APPARATUS

[75] Inventor: Louis Nett, Cambridge, Wis.

[73] Assignee: Gallina Corporation, Waukesha, Wis.

[21] Appl. No.: 847,161

[22] Filed: Apr. 2, 1986

[51] Int. Cl.⁴ .......................................... F27D 11/02
[52] U.S. Cl. ............................. 219/438; 219/415;
   219/343; 219/342; 219/440; 99/403; 99/407
[58] Field of Search ....................... 219/429–441,
   219/343, 342, 415–419, 339; 99/330, 336, 448,
   403, 407, 411; 126/362, 365

[56] References Cited

U.S. PATENT DOCUMENTS

| | | | |
|---|---|---|---|
| 2,187,888 | 1/1940 | Nachumsohn | 219/417 |
| 2,716,938 | 9/1955 | Smith | 99/408 |
| 3,280,722 | 10/1966 | Rahauser | 99/332 |
| 3,363,541 | 1/1968 | Anetsberger | 99/408 |
| 3,410,199 | 11/1968 | Quednau | 99/403 |
| 3,610,133 | 10/1971 | Mies | 99/337 |
| 3,677,170 | 7/1972 | Shelton et al. | 99/337 |
| 3,701,313 | 10/1972 | Boggs | 99/330 |
| 3,900,580 | 8/1975 | Boggs | 426/417 |
| 3,937,136 | 2/1976 | Cox | 99/408 |
| 3,940,589 | 2/1976 | Tupper | 219/417 |
| 4,296,310 | 10/1981 | Luebke et al. | 219/440 |
| 4,505,193 | 3/1985 | Mariotti | 99/330 |
| 4,574,183 | 3/1986 | Knauss | 219/438 |
| 4,574,688 | 3/1986 | Barbieri | 219/438 |

FOREIGN PATENT DOCUMENTS

| | | | |
|---|---|---|---|
| 0044530 | 5/1937 | Fed. Rep. of Germany | 219/440 |
| 1125592 | 3/1962 | Fed. Rep. of Germany | 219/438 |
| 3043623 | 7/1982 | Fed. Rep. of Germany | 219/438 |

Primary Examiner—M. H. Paschall
Attorney, Agent, or Firm—Andrus, Sceales, Starke & Sawall

[57] ABSTRACT

A pressurized batch cooking pot has an encircling radiant heater which has a high temperature insulation shell with end abutting the pot and a center portion spaced from the pot. A spiral coil is firmly embedded within the inner wall of the insulation shell with the outer surface of the coil turns opposed to the pot exposed and flattened. The oil level in the pot is somewhat above the uppermost end of the heating coil. The air gap between the coil and the pot is selected for efficient energy transfer. The spiral coil is formed in vertically spaced rows circum-ferentially distributed about the pot. Integral end connections are formed substantially rectangular with a plurality of coil turns integrally joined to the turns of the parallel rows by a similar integral U-shaped wire. The pot is a relatively elongated unit having a length to diameter ratio of at least 1.6 to 1. The outside of the sidewall of the pot has a black body coating. The cooking oil is operated with a cooking temperature of approximately 300° F. to 335° F. The heater is a modular construction having identical sections for each phase line of the supply.

13 Claims, 3 Drawing Sheets

PRESSURIZED LIQUID COOKER WITH INTEGRATED RADIANT HEATING APPARATUS

BACKGROUND OF THE INVENTION

This invention relates to deep oil cooking apparatus and particularly to such apparatus for rapid and efficient cooking of chicken, other meat products, vegetables and food products.

Generally a restaurant menu often includes chicken, fish, vegetables and other foods which may be cooked or fried by immersion in hot cooking oil. Certain restaurants specialize in such foods, particularly deep cooked chicken. In addition to the conventional restaurant where the food is consumed on the premises, various restaurants and other food retail outlets have a substantial food carry-out business including chicken. In those restaurants and other outlets having large sales volume of cooked foods, a rapid and efficient cooker is essential in order to produce quality products at a reasonable and profitable cost.

The conventional apparatus for deep cooking includes a relatively large kettle or pot having a releasable high pressure sealed cover. The pot is filled with cooking oil to a level in spaced relation to the cover. A heating unit generally in the form of immersion heating elements or an encircling heat unit applied adjacent to the pot is operative to increase the temperature of the oil to the desired cooking level. With the external heating unit, the heating unit may be held abutting the pot or spaced from the pot to establish heating by radiant energy. The chicken is placed in a suitable multiple shelf basket for transfer and immersion into the cooking oil for deep cooking for a selected period and removable therefrom. For example, a widely used cooker includes a rectangular shaped pot of approximately 13-17 inches across and a similar depth. The cooker is adapted to maintain and cook approximately ten pounds of chicken parts in each cycle. In one system, the oil is raised to a temperature of 370° to 375° and the power is cutoff just prior to placing the chicken in the pot. The chicken is then cooked for approximately eleven minutes and removed. Other commercial production units are constructed to operate with a continuous power supply and with the oil held at a temperature of about 350° F. to prevent boiling of the oil.

In all systems, a valve unit is provided for periodic withdrawal and replacement of the oil from the cooking apparatus. Systems for filtering of foreign material from the oil which is created during the cooking process have also been suggested. Thus, a consistent and flavorable product is dependent upon use of clean oil which has not been burnt or otherwise broken down. Although such systems are widely used, the present inventor has recognized a number of features which contribute to inefficiency of the cooking apparatus, as well as unnecessary costs.

The oil is held at the high temperature and the temperature in the cooker above the oil level tends to rise to a level which may cause scorching of the oil. The oil of course is contaminated with foreign matter during the cooking sequence and in general practice a batch of oil is withdrawn and periodically replaced with fresh oil, which may have been preheated. The replacement of the oil combined with the necessity of heating the oil reduces the efficiency of system operation.

Prior art commercial units have generally used immersion heating elements projecting into the oil within the lower end of the cooking pot. The immersion heating elements are operated at approximately 350° Fahrenheit. The temperature at which oil will boil is approximately 360° Fahrenheit and the immersion units are operated as close to such temperature as possible without significant possibility of boiling. Immersion units are known to have certain distinct disadvantages. Operation at such high temperatures is used to rapidly heat the oil results. However, some scorching of the oil results with a degradation of the oil. Generally for every 20° of increase in temperature above 300° for example, the degrading effect is approximately doubled. The degradation of the oil at least in part is created each time the cooking pot is opened because the oil is at the high temperature and the oil surface is agitated. In addition, when cooking breaded products such as deep fried or cooked chicken, some of the breaded coating, which is widely applied to the uncooked chicken, drops from the chicken during the cooking process. The crumbs and even small pieces of chicken fall through the oil to the bottom of the pot, and in so moving some is often deposited on the heating elements. The coating on the heating elements not only reduces the heat input into the oil but results in increased scorching of the oil as the result of the excessive frying of the breading product. Generally this requires frequent discarding of the oil and replacing of the oil with totally clean new oil.

The cooking oil is a significant cost factor of commercial production of deep cooked food and operators are continuously monitoring and taken such action as possible to minimize oil usage. This may result in using of oil which is marginally acceptable and compromising with a somewhat lesser quality product. This is particularly true in operations which may be operated by managers rather than owners of the commercial operation.

Although exterior encircling heating units have been suggested including radiant heating units to avoid the difficulties associated with immersion units, the provision of an adequate external heating unit which rapidly heats the oil to the operating temperatures and maintains the oil at the desired temperature have not been to the inventor's knowledge satisfactorily solved. The cooking pot within which the product is placed is generally a relatively large flat, wide pot having a depth approximately equal to the width, with the product uniformly distributed throughout the cooking oil. The cooking oil is a relatively poor conductor of heat and consequently with external heaters it has been difficult to produce the desired heating level within the oil particularly with a highly uniform temperature through the oil proper.

The cost of the oil in the prior art devices is particularly significant because of substantial quantities of oil used to cook products and the associated relatively high energy levels required to heat the oil. Generally, in commercial production 55 to 60 pounds of oil are used for batch cooking of 10 pounds of product. Total replacement with fresh oil results in a significant cost factor. A large heating units operating to produce 11 to 12 kilowatts of energy are necessary to produce the proper temperature and time cycle. The heating units are distributed over the large surface of the oil to minimize the wattage per square inch of surface and thereby minimize scorching of the oil. Because of the relatively large flat pots required by the large oil level quantities, both the oil cost and the energy costs are extremely significant.

The high pressure cooking process also requires release of the pressure within the cooker prior to complete removal of the cover. However, the system should permit the rapid cycling and the removable of the cooked chicken and replacement with a fresh batch of uncooked chicken. The cover is therefore generally provided with a mechanical latch mechanism which incorporates a pressure release mechanism. The efficiency of the cycling is directed related to the efficiency of the mechanical release mechanism.

Although various deep cooking pot units are used in the industry, there is a continuing need for a more efficient and effective batch cooking pot-type apparatus and particularly an apparatus which provides for a more rapid and energy efficient cooking cycle.

SUMMARY OF THE PRESENT INVENTION

The present invention is particularly directed to an improved integrated batch deep cooking apparatus including a pressurized batch cooking pot having an integrated radiant energy heating unit. Generally in accordance with the teaching of the present invention, the cooking apparatus is formed including a suitable metal pot having a releasable, pressure cover. Cooking oil is contained within the pot to a suitable depth or level spaced from the pressure cover. A special radiant energy heating unit is secured surrounding the pot unit essentially within the confines of the oil level. The special heating unit is confined by and within a high temperature insulation which is specially selected and properly spaced from the pot to maximize the transfer of radiant energy from the coil unit into the aligned pot and in particular with that portion of the coil unit aligned with the cooking oil. The insulation to the opposite ends of the coil unit is formed to engage the pot wall and define a high temperature radiant energy transfer chamber or reservoir about the pot. The heating unit is energized to rapidly raise the temperature within the heating chamber and the pot to a higher level than the cooking temperature of the oil with the heat transfer through the pot wall and the oil to raise the oil to the desired cooking temperature and to hold such cooking temperature. To establish an efficient cooking cycle, the heating unit must provide a selected energy density. A particularly satisfactory heating unit includes a high-temperature wire coil which is essentially embedded within a high temperature insulation. Generally, a preferred insulation process is more fully disclosed in the U.S. Pat. No. 3,500,444 which issued Mar. 10, 1970 and is assigned to Johns-Mansville Corporation. The heating wire coil is formed as a spiral coil which is firmly embedded within the high temperature insulation with the outer surface of the coil turns opposed to the pot exposed. The exposed portion of the coil turns are preferably flattened to establish radiant energy transmitting surfaces which are essentially parallel to he vertical wall of the cooking pot. However, the coil unit and air gap should be substantially only aligned with the oil containing portions of the pot, and with the oil level somewhat above the uppermost end of the heating coil element. The heat radiated from the coil is essentially through the narrow air gap between the coil and the pot. The pot is preferably provided with a black body coating to improve the energy transfer to the pot wall and thereby to the oil. This results in a highly efficient concentration of the energy from the exposed surface of the coil through the narrow air gap onto the pot for transfer through the oil. Oil is a relatively poor thermal conductivity and the absorption rate and generally maximum energy transfer limit at the gap and pot temperature approached slightly over 1,000° F. The coil is therefore operated above 800° F. but preferably at or below 1,050° F. to produce efficient heating of the oil. The coil is preferably spaced from the pot just sufficiently far to produce proper radiant energy transfer for the operating temperature of the heating oil. In order to adequately establish the desired input energy density, the spiral coil is advantageously wound within the insulation in a parallel rows arrangement with adjacent rows in close spaced relation. The inventor further discovered however, that the multiple row coil arrangement of the spiral coil did not provide an optimum system because apparently of the creation of hot areas within the heating unit. The inventor realized that the bending of the coil at each row end resulted in a heating pattern which did not provide a uniform heat pattern but rather produced undesirable localized or concentrated areas of heating particularly the row end. This non-uniform distribution of heat within the heating unit results in a weak structural area and may not produce uniform heating of the oil. The radiant energy coil is thereby constructed to establish a maximum heat density per unit of heating surface while maintaining the integrity of the heating unit.

In a preferred unique coil unit construction, the multiple row spiral coil is formed of the relatively thin and high temperature wire which is wound with spaced coil turns and with each row circumferentially distributed about the pot. The integral end connections are formed as special expanded extensions of each linear coil row and are particularly constructed and arranged to avoid high temperature locations at such connections. The inventor has particularly discovered that the heating coil unit is, in an optimum construction, an expanded spiral coil having successive coil turns spaced from each other by a sufficient distance to provide effective thermal insulation between coil turns within the coil to prevent generation of damaging temperatures within the coil unit and to transfer the heat from the inner embedded portion of the coil outwardly of the coil insulation. Further, the opposite return ends for the connecting runs or rows of the coil include a substantially rectangular connecting construction, which include a plurality of end turns formed as a parallel expanded spiral coils spaced essentially in accordance with the spacing in each run. The end turns are integrally joined to the turns of the parallel rows by a similar elongated generally straight and integral wire which is formed into a right angle bend to extend between the row and the adjacent end of the end turns. This construction again properly distributes the individual coil turns of the heating coil throughout to prevent undesirably close spacement of the coil turns, thereby eliminating the creation of relatively hot spots within the coil unit and the heating chamber.

In another aspect of the invention, the inventor has further discovered that it is highly desirable to use a relatively elongated and small diameter cooking pot in contrast to the prior art which generally uses a relatively short and large diameter pot unit. The inventor has discovered that the more narrow pot, particularly with the concentrated heat level, develops an improved circulation of the oil over the food product within the cooking unit and further contributes to the uniform distribution of the hot oil within the unit and movement over the food product therein. The relative short distance the heat energy must travel to the center of the oil also minimizes stratification. The pot is uniquely formed with a depth substantially greater than the width or diameter to create improved circulation of the oil within the unit. Although the ratio of the diameter to length is not critical, generally a ratio of 1 to 1.6 has been found to provide a highly satisfactory and significant improvement in the effective deep frying cooking of product.

Although any desired cooking cycle can be used, the present inventor further discovered that the cooking cycle may use an oil temperature which is significantly reduced, without requiring any significant change in the other parameters. In this aspect of the invention has found, the oil may be operated and contained at a temperature of approximately 300° to 335° Farenheit with the meat, fish and vegetables product and the like thoroughly cooked in a maximum time of about 3 minutes for vegetables and 13 minutes for heavy chickens.

Further, the heating unit may be constructed to be energized from a single phase supply or from a three phase supply. In accordance with a further unique aspect of the present invention and particularly with the preferred unique coil structure, the coil unit is formed as a modular construction having a separate section for each phase of the supply. Thus, for a single phase, two similar sections are used while for three phase supply, three similar sections are used. The two sections for a single phase supply would be similar 180 degree sections mounted to encircle the pot and connected to a single phase supply. Similarly, in a three phase system, the three 120 degree sections are mounted to encircle the pot and are interconnected to each other to provide a suitable three phase coil winding for direct connection to the three phase power supply. If one of the sections is damaged, the single damaged section is readily replaced without the necessity of replacing the total heating assembly of the cooking unit. The modular construction minimizes the cost to service and maintenance of the deep frying apparatus.

In a preferred construction, an essentially closed filter system is coupled to the cooking pot to allow periodic circulation of oil from the pot through a filter means and back to the pot for purposes of filtering foreign matter, and including an oil reservoir for replenishing the supply with additional oil which added with the recycled oil in a rapid and effective sequence. A unique filter system, as disclosed in the copending applicant entitled "Oil Filter Apparatus and Method For Deep Oil Pressure Cooking Apparatus" filed on even date herewith, has been used wherein a reservoir is provided with fresh oil and connected in the filtration system. The combination of cooking at a relatively two temperatures and maintaining the oil in a highly "sweet" state, as generally referred to for cooking oil which produces a high quality cooked product, permits continued cooking with periodic addition of oil to maintain the proper level for cooking.

The present invention has been found to significantly contribute to the effective and efficient cooking cycle. The invention particularly significantly reduces the energy requirements for batch frying of chicken or the like.

DESCRIPTION OF THE DRAWING FIGURES

The drawings furnished herewith generally illustrate the best mode presently contemplated for the invention and are described herewith.

In the drawings.

DESCRIPTION OF THE ILLUSTRATED EMBODIMENT

Referring to the drawings and particularly to FIGS. 1-4, a portable deep cooker 1 is illustrated for sequential or successive deep cooking of breaded chicken parts 2 or other meat, fish or vegetable product. For purposes of reference, the product well be referred to herein as chickens. The deep cooker includes an inner open-too cooking pot 3 mounted within a portable decorative and protective support structure. The pot 3 is specially formed as a long narrow pot, as hereinafter described. A cooking oil 4 fills the pot 3 to a selected level 5 in downwardly spaced relation to the upper end. A cover unit 6 is releasably, pressure sealed to the upper end of the cooker, with a latch mechanism 7 to tightly seal the cooker pot 3 and define a high pressure, deep oil cooker. A special radiant heating unit 8 encircles the pot 3 for rapid and effective heating of oil 4. The pressure closure of the pot 3 provides a high temperature cooking, and the present invention is particularly directed to improvement in such pressurized cooking apparatus. The radiant heating unit 8 is specially constructed with a heating coil element 9 embedded within a high temperature insulation shell 10. The heating unit 8 is located with the insulation shell abutting the pot 3 and having a recess 10a on the inner surface 14 in alignment with cooking oil level 5. The coil element 9 is embedded in the base wall of recess 10a and is located in close but spaced relation to the sidewall of pot 3. The coil 9 and insulation 10 is specially constructed and arranged to create rapid transfer of radiant energy from the coil 9 through the heat radiant energy transfer chamber 11 defined by recess 10a, to the pot 3 and therethrough and through to the oil 4 in an effective and efficient manner.

The total assembly is housed within a decorative and protective enclosure or cabinet 11, with the integrated pot 3 and heating unit 8 supported on a suitable wheeled base super structure 12. An oil reservoir 13 is provided in the front and bottom portion of the cabinet 11 within which oil 4 is stored for subsequent use. The lower end of the pot 3 is provided with an outlet connected in a flow circuit with a filteration system 14, including reservoir 13, for selected circulation of the oil 4 from and back to the pot 3 and during such circulation to remove foreign matter 16 and to add limited amount of fresh oil, between batch cooking cycles of cooker 1.

A multiple-shelf food basket 15 is adapted to be placed within the pot 3 and supports the food product parts 2 in vertically spaced relation immersed within the oil 4 for cooking. The basket 15 is provided with a hook, not shown, on the upper end to permit manual handling by a known L-shaped tool, not shown. The basket is removed and replaced with another by the operator for replacement of the cooked chicken with uncooked product.

In the operation, the oil 4 is raised to a desired operating temperature such as within the range of 300° to 335° F. The basket of uncooked chicken 2 is placed in the cooker pot 3 and the cover unit 6 is closed and sealed. The oil will drop in temperature, and typically to 290° F. The heating unit 8 is maintained energized to rapidly bring and hold the temperature of the oil 4 to the desired cooking temperature and to hold such temperature until shortly before the end of the cooking cycle. The energy is concentrated in that area of the cooking pot 3 filled with oil 4 and the free space above the oil does not rise in temperature significantly above such temperature. This significantly prevents scorching of the oil and contributes to use of the oil over long periods. In addition, periodic filtering of the oil 4 in pot 3 and replenishing with fresh oil for that absorbed by the food product during the cooking cycle contributes to maintaining a cleans "sweet" oil and permits continuous use of a given batch of oil over a long if not indefinite operating periods.

During the cooking process, the oil 4 circulates in a vertical pattern to eliminate stratification within the oil which moves about the chicken 2 with a rapid, uniform and effective cooking of the chicken. The narrow and elongated pot 3 contributes significantly to a more effective circulation of the oil 4 about the chicken parts to substantially improve the cooking efficiency. In cooking of less than maximum product load, the chicken product 2 should be located to fill the lowermost shelf or shelves of basket 15. The oil 4 thus moves upwardly with the maximum circulation of the oil over the product. If the load is evenly distributed, the oil may not raise upwardly to completely cover the product. After a predetermined fixed cooking time, the cover unit 6 is removed. The basket of cooked chicken is rapidly removed, allowed to drain and replaced with a basket of uncooked chicken. The replacement basket is lowered into the oil and the cover unit 6 is replaced and the cycle repeated.

During the cooking cycle, the oil of course may be contaminated with foreign matter 16 such as particles of chicken, the breaded coating of the chicken or the like. If allowed to remain in the oil 4, degradation results.

In the illustrated embodiment of the invention, the filteration system 14 is constructed as an essentially closed filtering system connected to reservoir unit 13 for removing the oil 4 from the lower end of the kettle or pot 3. A prefilter unit 17 is secured to the bottom wall of pot 3 and is connected to remove the larger cooking particles 16 from the oil 4. The oil 4 is then recirculated through the reservoir unit 13, a fine filtering unit 18 and then returned to the pot 3. The storage and make-up reservoir unit 13 is housed within the lower end of the outer housing 11 and oil 4 is gravity fed from pot 3. A pump 18 provides for recirculation of the oil from reservoir 13, with selective addition of oil to the pot 3 to provide a full fill of oil.

Figure 1:
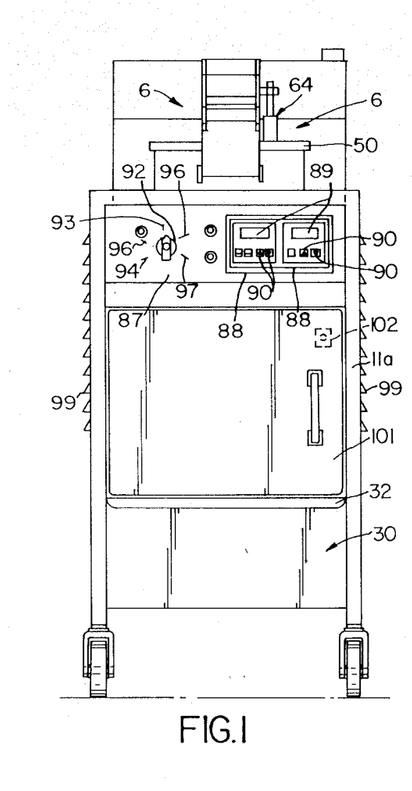
FIG. 1 is a front elevational view of a portable chicken cooker illustrating a preferred embodiment of the present invention.
Figure 2:
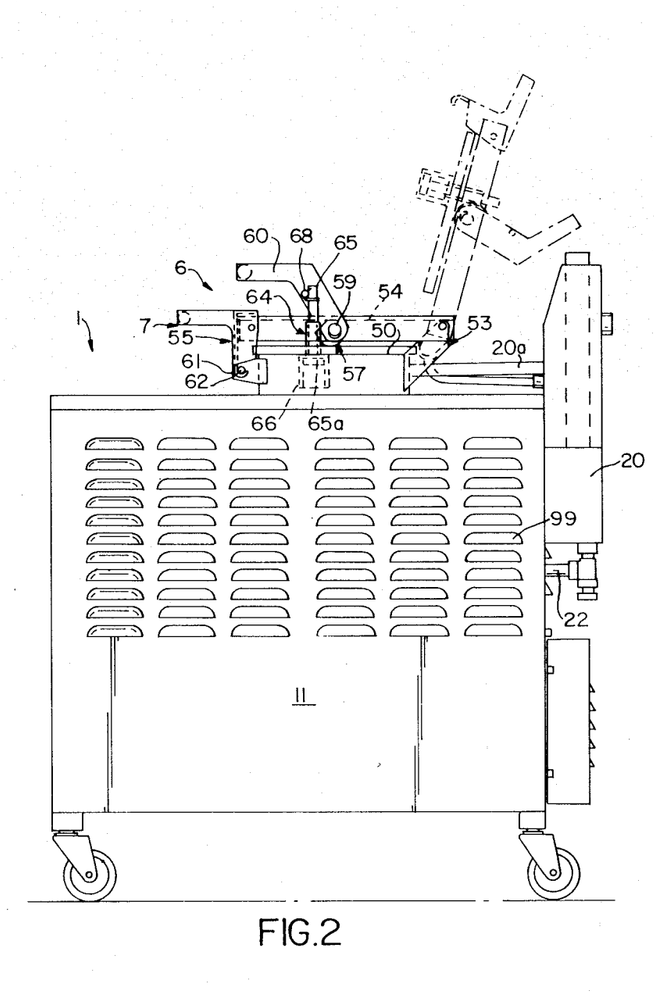
FIG. 2 is a side elevational view of the portable chicken cooker shown in FIG. 1.

Referring particularly to FIGS. 1 and 2, the portable unit includes a overflow container 20 mounted to the back and top portion of the cabinet 11. A pressure release line 20a is connected from the upper end of the pot 3 above the too wall of the cabinet 11 and extends rearwardly to a pressure release solenoid valve 21. The discharge side of the valve 21 is connected to the container 20. At the end of the cooking cycle, the solenoid valve 21 is energized to open and bypass the high pressure in the sealed pot 3 to atmospheric pressure as established within the container 20. This establishes a safe condition for opening of the pot 3.

A pressure relief safety valve 21a is also coupled directly to the line 20a. The safety valve provides automatic release of pressure from pot 3 in the event the pressure rises above a safe maximum operating level.

The container 20 is vented by a simple vent tube and is coupled by a transfer or drain line 22 to a small collector pan 22a in reservoir unit 13 for receiving of oil and moisture. The drain line 22 extends beneath the cooking pot 3 and above the reservoir unit 13, and terminates in a downwardly extended discharge open end aligned with a drain pan 22a in the forward portion of the reservoir unit. The line 22 may be provided with a drain valve at the container for direct removal or transfer of the accumulated oil moisture from the container.

The elongated cooking pot 3 with the small exposed upper surface and minimal oil quantity and closed filteration system allows the continuous cycling of the pressure cooker with minimal interruption of the cooking sequence. Thus, after a fixed number of cooking cycles, the oil level in pot 3 will drop below a desired level as the result of the absorption of some oil by the product. Some decrease in level is permissible but in view of small volume of oil used, additional oil is necessary to maintain high quality production. The filtration system permits oil addition as well as proper cleaning of the oil 4 from pot 3 and thereby contributes to maximum time and cooking efficiency.

The present invention, in its various aspects, is particularly directed to the construction of the cooking pot 3 and the heating unit 8 as well as the interrelationship therebetween and the other features of the illustrated embodiment to establish an improved means and method for the rapid and efficiency cooking of food product. The various illustrated structures are described in such detail as to fully disclose the preferred construction and process based on the present novel teachings.

Figures 5, 6, 8:
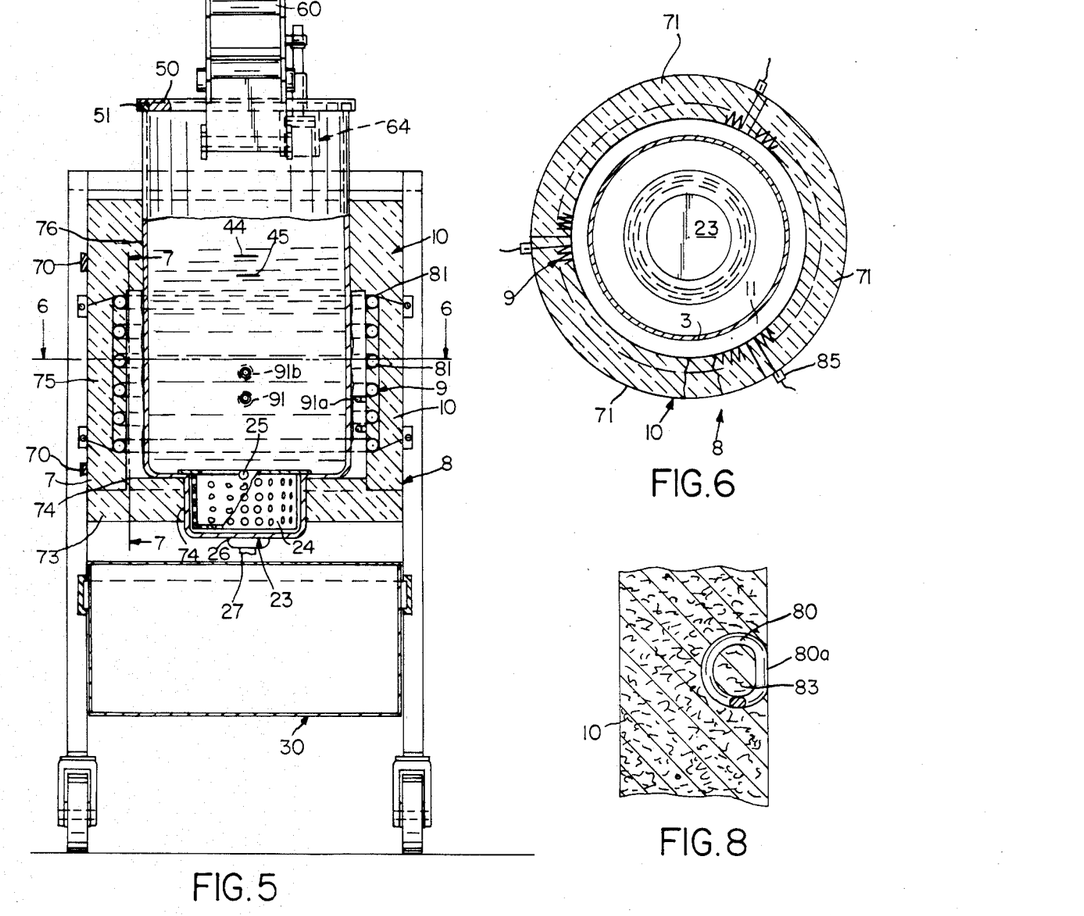
FIG. 5 is a transverse section taken generally on line 5—5 of FIG. 4.
FIG. 6 is a horizontal section of the heating unit and cooking pot shown and taken generally on line 6—6 of FIG. 5.
FIG. 8 is an enlarged fragmentary view of the heating unit more clearly illustrating a coil and coil insulation of the heating unit.

More particularly in the illustrated embodiment of the invention, the cooking pot 3, as most clearly shown in FIG. 5, is especially formed having a relatively small diameter and elongated cylindrical depth. The cooking pot 3 is shown formed as an integral tubular, round unit of a suitable metal such as stainless steel and is preferably formed as relatively heavy wall element such as of a ten gauge stainless steel. The wall thickness of the pot 3 is of course constructed to withstand the operating pressures and temperatures, while providing for an efficient transfer of the radiant energy from the high temperature heating unit 8 through the chamber 11 and the pot wall to and through the cooking oil 4. The outer wall of the pot 3 is coated with a "black body" coating 22b to promote the heat absorption and transfer into the pot wall and thereby further increase the heating efficiency of the heating system for optimum heating of the oil. The depth of the cooking pot 3 is substantially a multiple of the width or diameter thereof. For example, in a practical construction, the depth to width ratio was substantially 1.8 to 1. The elongated narrow pot 3 reduces the length the energy must move to the center of the batch of oil 4, and thereby promotes not only the rapid heating of all the oil to the desired cooking temperature but also produces a more uniform temperature across the cooking pot 3. The narrow, long pot further promotes the circulation within the pot and thus contributes to a more uniform temperature of the cooking which moves over the chicken to produce rapid and thorough cooking thereof.

An elongated cooking pot wherein the length is substantially longer than the width or diameter, and which is defined herein as having a ratio in excess of about 1.6 to 1, well include only minimal stratification of the heating oil within the cooker under operating conditions. If only a partial load of chicken is distributed evenly in accordance with conventional practice throughout the cooker, the product on the upper shelves and thus in upper portion of the oil is not as thoroughly cooked as that in the lower portion of the oil. The inventor has discovered that this uneven cooking phenomena is obtained with the elongated cooker when cooking less than full loads. When only a partial load is cooked, the oil level may not rise to completely cover the product. The simple solution to insure full product cooking is to place the product so as to substantially fill the lower shelf or shelves, and progressively to move upwardly through the support structure. If this procedure is followed, the product is always thoroughly and evenly cooked with repeated cycling or the like.

Pot 3 may be formed as a slightly tapered bottom wall having an integral, depending chamber 23 of prefilter unit 17 in the center of the bottom wall. The chamber 23 forms a catch basin which is approximately half the width of the pot 3 and has a depth equal to approximately one-half its width. A small catch basket 24, essentially corresponding in size to the chamber 23, is removably disposed in the chamber 23. The basket 24 is formed of a perforated stainless steel plate, with opening of approximately one-eighth inch for example, and has a plurality of radial spokes 25 in the upper portion. The spokes 25 define a handle for removal of the basket 24 from the pot and removal of the solid matter 16 which accummulates in the basket. The large catch chamber 22 and basket 24 functions as prefilter in the filtration system for removal of such foreign matter from the oil and reducing the degradation of the cooking characteristic of the oil, as well as providing a by-product for use in a gravy and the like if desired.

The bottom or base wall of the chamber 23 includes a pipe coupling 26 connected to an outflow line 27 forming a part of the filtering system 14 for recycling of the oil in the pot 3 for final removal of small or fine foreign materials and to add oil from reservoir 13 in accordance with oil absorbed by the chicken 2 during the cooking cycle.

The oil 4 may be a standard cooking vegetable oil such as presently used by various fast food restaurants. The oil 4 is available be either as a liquid or solid material. A solid shortening is often used because it is less costly. If solid, the shortening is generally chopped up and melted in the pot 3, or in the oil reservoir unit 13 and then transferred to the pot 3 at a relatively low temperature to prevent scorching. The use of the oil reservoir 13 is convenient because of its low temperature operation which holds the oil in the reservoir at about 150° F. The heated oil is then pumped to the pot 3 which is held at or above 200° F. standby temperature for subsequent heating to the operating temperature of 300° F. or above during one or more cooking cycles.

The oil reservoir unit 13 is specially constructed as an essentially closed unit and preferably constructed to provide a minimum air space between the upper oil level in the reservoir and a removable cover when containing oil sufficient to fill the pot 3 and/or replenish the oil absorbed during the cooking cycles. If the cooking unit is shut down, the oil is drained from the pot 3 into the reservoir 13 for storage and the oil is substantially isolated from the surrounding environment to again minimize oxidation and scorching of the oil.

The illustrated reservoir structure or unit 13 is constructed as described in the invention previously identified application and consists of a rectangular supporting drawer 30 which is slidably mounted within the enclosure by a pair of oppositely located linear slide units 31. The drawer 30 is mounted in the bottom of the cabinet 11 beneath the pot 3. The front wall of the drawer 30 extends upwardly with a reverse hook portion 32 defining a handle for sliding of the drawer 30 into and from the cabinet. The forward portion of the drawer 30 includes a dividing wall 33 defining a pocket of a relatively short depth. A drain overflow pan 34 is located within such shallow portion and is adapted to receive drain moisture and oil 35 from the cover and blow off tank 20. The principal portion of the support drawer 30 extends beyond the small drain pan 34 and receives a larger reservoir pan 36 which projects upwardly above the drawer level slightly. The pan 36 is a relatively flat, shallow pan 36 which holds at least 18 pounds of the liquid oil 4 and preferably on the order of pounds. The pan 36 is thus located beneath the pot 3 in the inserted position of the drawer. The upper end of the pan 36 has an outwardly projected encircling flange 37. A dished cover 38 has an outer flange 39 corresponding to the pan flange and is adapted to be removably inserted into the pan 36, projecting inwardly into the pan with the cover flange 39 resting on the pan flange 37. The inwardly dished walls fits closely into the vertical wall of the pan 36 to effect a significant closure of the top of the pan. A heating unit 39 is secured to the bottom of the drawer and is operable to hold the oil at a temperature substantially below the cooking temperature, and typically at 150° F.

In most operations, the cooker does not operate 24 hours a day and will normally be shut down at night. With the present invention, the oil 4 is drained and stored in the closed reservoir pan 36, with heating unit 39a turned off. The closed pan 36 with the minimal spacement between the top oil level and the cover 38 minimizes any oxidation and degradation of the oil.

Thus the applicant has found that the same oil can subsequently be used essentially as if completely new oil were supplied when the system is recycled.

An inlet/outlet line 40 is secured to the back wall of the pan 36. The line or pipe 40 has its upper end mounted to the pan immediately beneath the flange 37, and extends downwardly adjacent the bottom of the pan for withdrawing of the oil 4 from the lower most end of the pan. The upper end of the pipe 40 extends out of the rear wall of the pan. A releasable coupling member 41 is secured to the upper end of the pipe 40 and abuts the backwall of the pan and is releasably connected by a complementing coupling 42 to the end of an input/output line 43 of the filtering system as more fully developed hereinafter. Line 43 is coupled to pot 3 to fill the pot with oil 4.

The operation actuates the pump 21 to fill the pot 3 with oil 4 to a selected level, which may be shown by a suitable mark 44 on the pot. Alternatively, the position of an element, not shown, on the usual reference for determining oil level. The level is spaced from the upper edge of the pot 3 and the sealing cover unit 6. The level 44 is selected to allow filling of the pot 3 with a selected quantity of chicken product 2 and basket 15 and maintaining a free space above the increased oil level. Generally, the oil fill level may be allowed to drop a selected amount such as within an inch and one half of the maximum fill level 44, to a second level which may be shown by a mark identified as the add mark 46 or line, or again the tool element may be used to locate the add level. For example in practical structure, the pot was constructed with a total depth of 18 inches to the bottom wall and a width of nine inches. The fill level line 44 was nine inches from the upper edge of the pot and the add line was one inch below the fill line. The pot was constructed to hold 18 pounds of shortening when filled to a maximum or 2 pounds per inch, and the add-full line difference was equal to approximately 2 to 2½ pounds. Although the precise diameter to length ratio of the cooking kettle is not critical, the length should be multiple of the diameter and preferably having a length which is at least 1.6 time the diameter or width, and in the practical implementation was 1.8 to 1.0.

The oil quantity used is a significant cost factor in the operation of the cooker 1, and particularly where a given commercial operation includes a plurality of different outlets. The particular cooking temperatures, times levels and cycles may vary at the several installations or outlets depending upon the personnel in charge. In order to establish a more uniform quality of the product, the system operator replaces the cooking oil at all outlets at the same interval in anticipation of worst case operation. Generally, prior art deep cooking oil 4 for cooking of chicken and other similar products is often operated at a cooking temperature of approximately 350° which is the level slightly below the 360° F. level at which the oil used boils. Other systems use even higher temperatures.

The high temperature cooking oil is particularly subject to degradation as a result of oxidation. Thus, whenever a hot cooking oil 4 is exposed to the atmosphere, such as on opening of the cover at the end of a cycle, some oxidation will occur, with a corresponding degrading of the cooking oil characteristic. The degradation is also generally directly related to the temperature level and increases with the temperature level. In the normal operation, the oil is thus not only subjected to some level of degradation during each cycle of removal and replacement of the food product, but is further subject to degradation during the normal filtering wherein the oil is dumped into an open top container having a filter wall. The high level temperature of 350° F. has however been widely used because of the large quantity of oil which must be heated and to ensure a rapid and thorough cooking of the chicken or other food products, particularly where temperature gradient within cooking oil is anticipated. The temperature gradient may be minimized by agitation of the cooking oil prior to introduction of the product. Thus, the designer of deep oil cookers has often assumed that there will be some temperature differential within the unit, and that some mechanical stirring and mixing of the oil is desirable to obtain a relatively even elevated cooking temperature. The present invention permits use at a reduced temperature, and even if operated at the higher temperature will provide improved oil life, minimal oil consumption and reduced energy requirements.

In summary, the present invention in its preferred construction can operate on a production basis using 18 pounds of shortening for successive batch cooking of 10 pound batches of breaded chicken parts. A total cooking cycle requires approximately 12 minutes for cooking, and permits cooking in excess of four loads per hour including periodic recycling and filtering of the oil during each hour. Further, the total energy consumption required has been about 6 kilowatts. Such efficiency and an optimum operation is related to the combination of the several features disclosed herein. Thus, the unique exterior radiant heating unit establishes a very efficient and effective source of heat for heating of the oil to the desired operating temperature. The elongated pot of course significantly minimizing the distance the thermal energy must move into the oil and contributes to thorough and uniform heating of the oil as well as promoting the thermal circulation of the oil within the elongated pot. Further, the effective control of the oil of the temperature by directly sensing the oil temperature further promotes the efficiency of cooking. Although other high powered cookers may be able to cook products in equal quantity of product the safe and perhaps in a slightly shorter time period, the required maintenance and servicing as well as the very large quantities of oil and high energy costs used result in a significantly lesser overall cooking efficiency.

Finally, the preferred filtering and recycling system and method which is more fully disclosed in the application of the inventor filed herewith and entitled "Oil Filter Apparatus And Method For Deep Oil Pressure Cooking Apparatus" contributes to a continuous production of a high volume of product, without necessity of a significant shut down time for replacement of oil, and/or cleansing of the equipment and pot structure. Generally, the filter system includes a drain line including a pan of series connected solenoid valves 46 and 47 connecting the prefilter unit 17 to the line 43 and line 40 of pan 36. A return or filter line 48 is connected between the two valves 46–47 and the fine filter unit 18 for transfer of oil from pan 36 through the fine filter oil unit 18 and pump 18 to the pot 3 via an inlet tube or pipe 49 to pot 3. The oil returned is of course a mixture of the oil used for cooking and new oil in pan 36 to replenish the oil absorbed by the product 2.

Although the inventor does not claim that the recycling can be maintained on a continuous cycling for an indefinite period. The novel unit can be operated over periods which are a substantial multiple of any period heretofore used. Eventually, as a matter of high quality control, the system will be shut down and the pots and lines thoroughly cleaned. The system will be then re-initiated and operates again for long period of time without the necessity of shut down maintenance or servicing shut down. In commercial fast food restaurants, weekly shut down and thorough cleaning is recommended for maintaining the highest quality of product.

The cooker is thus adapted to operate with less than 2 pounds of shortening per pound of chicken product and can produce 40 pounds of chicken per hour. The cooker operates over long periods without necessity of removing the oil in pot 3 and replacing it with 18 pounds of fresh oil, but rather only requires periodic filtering and adding of fresh oil to maintain the fill level. The system operates with the oil characteristic tending to decrease slightly below fresh vegetable oil, but rapidly reaching a constant level at which it remains indefinitely. Further, a low volume of oil is used for cooking of product, and advantageously is approximately in the ratio of less than two pounds of oil to one pound of product. During the cooking process, the product absorbs a small amount of oil. The amount of oil absorbed varies with the oil temperature and also with the pureness of the oil. Thus, vegetable oil is used for cooking. The meat product includes animal fat which breaks down into a rancid, acititic oil, particularly at higher temperatures. Although the presence of animal fat in the cooking oil in the pot cannot be avoided, the inventor has discovered that an adverse effect can be significantly avoided by the features of the present invention and can restrict the drop in the quality of the oil to a minimal and constant level. The present system with frequent addition of fresh oil as a significant percentage of filter oil has been found to limit the degradation of the cooking oil to a relative minimal amount during initial product cooking, and thereafter remains essentially constant for a practically indefinite period of cooking of successive batches, with proper addition of the fresh vegetable oil. There is a contrast to the conventional cooker which uses 55 to 60 pounds of cooking oil, and in which the inventor has found the degradation of the cooking oil is continuous with the cooking cycles. Thus, the proportion of fresh oil which is periodically added in a significant factor and the high temperatures of the cooking oil prior to and during cooking not only : creates oil scorching and oxidation but increases the adverse degradation created by significant addition of and breakdown of the meat product fats, which significantly contribute rancid and high aciditic fat to the cooking oil. In fact, in excess of 1,200 pounds of chicken has been cooked and the oil in the pot 3 was still of a high quality "sweet" oil. Those familiar with the commercial operation of fast food restaurants serving deep oil cooked chicken will readily recognize the significant savings in shortening and energy provided by the present invention.

The releasable cover unit 6 seals the upper end of the kettle during the cooking cycle to establish the high temperature pressurized cooking apparatus. Although any cover structure which will operate to maintain a sealed cooking environment may be used, a particularly satisfactory and unique cover is disclosed in the inventor's copending application entitled "Deep Oil Cooker Cover Apparatus" and filed on even date herewith.

Generally, the cover unit 6 includes a solid metal cover 50 which extends over the top edge of pot 3, which is formed as a flat finished sealing edge. A sealing casket 51 is located within an inner surface groove in the cover 50 and engages the upper flat edge of the pot 3.

As more fully disclosed in the above application, the cover unit 6 is pivotally mounted to the pot 3 by a pivoted hinge 53 and a clamping bar 54 which extends across the cover 50 and pot 3. A mechanical latch 55 is secured to the opposite outer free end and to the pot 3. The center of the bar 54 is secured to the cover 50 by a rotating cam unit 57 which in a release position permits limited relative movement between the bar 54 and the cover 50. A fan-shaped cam 58 is keyed or otherwise secured a pin 59 and pivots into engagement with the cover 50 and expands the bar and the cover. An operating handle 60 is secured to the opposite ends of the pin 59 for pivoting cam 58. The pivoting handle 60 downwardly toward the cover 50 moves the larger diameter of the cam onto the cover and the spiral cam surface forces the cover downward. Upward pivoting of the handle 60 moves the smaller diameter of the cam 50 onto the cover 51, and simultaneously the cam surface 40b abuts the handle.

Cam 58 sets latch unit 55 and prevents further upward pivoting of bar 54. The hook plate 61 having an inwardly bent hook adapted to engage a pin 62 affixed to the front of the pot. The hook plate 61 is pivotally mounted to move below the pin 62 into the latch alignment with the pin 45. As the bar 54 moves upwardly, the hook 61 engages pin 62 and limits the upward bar movement.

The cover unit includes a pressure interlock unit 64 which limits opening of the cover 58 if a dangerous pressure exists within the pot. Unit 64 includes a vertical sliding pin 65 slidably mounted in the cover and having a piston member 65 secured to the inner end. The piston member 65 is sealed within cylinder 66 by an o-ring seal. Pressure in pot 3 forces the pin 65 outwardly into the path of a lock pin 68 on the side of the handle 60 with the cover closed. This prevents release movement of the cam and cover opening until the pressure drops sufficiently to lower pin 65 below pin 68. Any other cover structure can of course be used, but should for practical purposes at least include a safety release mechanism to ensure effective and safe operation for cooking apparatus.

The heating unit 8 particularly forms a most significant unique feature and teaching of the present invention in producing a high efficient and low cost cooker. In the preferred embodiment of the invention shown in the drawing, the heating unit 8 includes the outer high temperature insulation shell 10 secured abutting the pot and held in place by encircling bands 70. The insulation shell 10 has spaced upper and lower lips defining the inner high temperature thermal chamber encircling pot 3. Heating element 9 is a spiral coil heating element and is embedded within the inner sidewall of the insulating shell 10, with the inner heating wire exposed and is operable to generate radiant heat which is transmitted through the chamber 11 for conductive transfer through the heavy wall pot 3 to the cooking oil 4. The inventor has found that the use of radiant energy requires appropriate spacement of the exposed coil turns from the pot for maximum heat efficiency. The wave length of the radiant energy appears to provide most efficient transfer at a particular spacement. A radiant energy heating element also operates most efficiently at higher temperatures and is preferably operated at a temperature level above 800° Fahrenheit. In a practical application, applicant has found that operating at about 1,000° Fahrenheit produces a rapid deep cooking of breaded chicken product and the like. In such an application, the heating unit was mounted with the inner recess wall and the exposed coil turns spaced from the pot wall by substantially ⅝ inches. The temperature in the chamber 11 is significantly higher and generally a substantial multiple of the desired maximum operating temperature of the cooking oil. For example, in a cooking apparatus using a temperature on the order of 335 degrees Fahrenheit, the thermal chamber may be operating at temperature on the order of 1,000 degrees Fahrenheit. The insulation is formed of ceramic fibers, which are heated by the heating coil and provide a thermal sink after de-energizing of the coil unit.

Generally, a substantial temperature multiple is defined as a ratio of at least two to one. The particular temperature is selected to operate conjointly with the particular pot and the contained oil 4 to permit a highly effective and desired change in the oil temperature with a minimal consumption of energy.

The illustrated electrical heating unit 9 is adapted to be powered from a three phase power supply. In accordance with a particular unique aspect of the present invention, the heating unit 8 is constructed of three identical sections 71. Each section 71 is connected to a different one of the three phases of the power supply. If anyone section 71 malfunctions for any reason, a single one of such common units is inserted in place of that which malfunctioned.

Each section 71 has the generally or recessed U-shaped cross section defined by an L-shaped member 72 and a separate bottom member 73 arranged to form the recess 10a and thereby the upper and bottom lips which abut the pot 3 and form the thermal chamber 11. The bottom member 73 is a flat, disc member having an opening 74 mating with the collector 24 and extending substantially coextensive therewith. The member 73 projects beneath the L-shaped member 72 and is recessed as at 74 to provide a mating closed connection. Member 72 has an outer leg 75 projecting upwardly to the maximum oil level mark and an inward leg 76 which has a curved end wall abutting pot 3.

Figure 7:
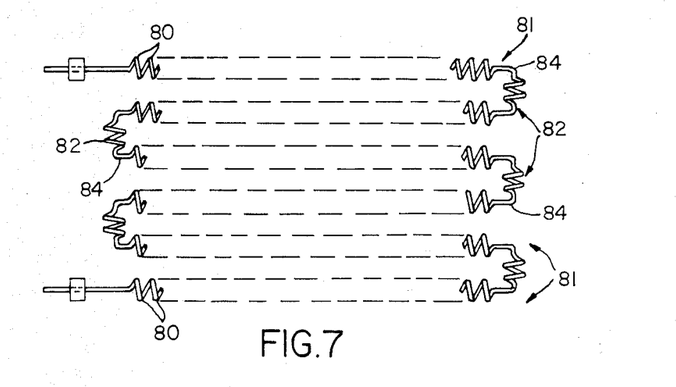
FIG. 7 is a separate elevational view of a heating coil element of the heating unit.
Figure 9:
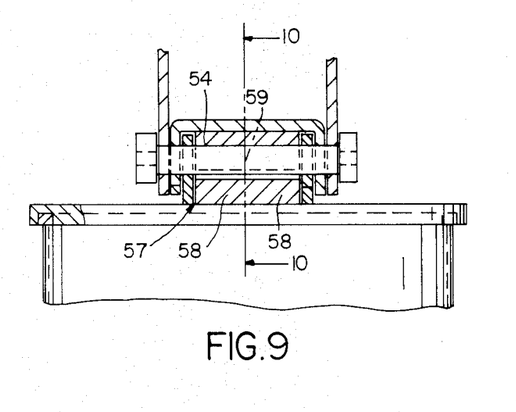
FIG. 9 is a fragmentary vertical section taken generally on line 9—9 of FIG. 4 and illustrating a cover operating safety interlock.
Figure 10:
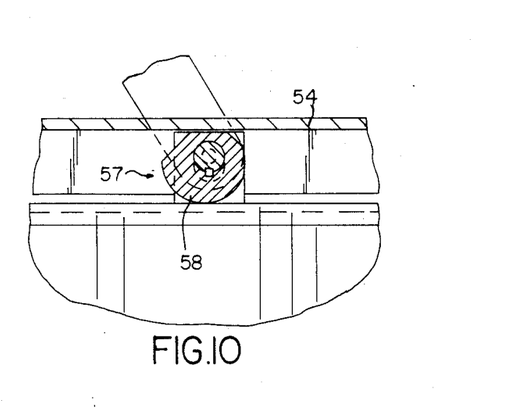
FIG. 10 is a vertical section taken generally on line 10—10 of FIG. 9.

In the preferred construction, the insulation 10 is vacuum formed about the heating coil 9, generally in accordance with the previous identified Mansville U.S. Pat. No. 3,500,444. The heating element 9 proper is a relatively thin temperature wire formed of a 12 gage wire into a spiral coil 9 with a plurality of coil turns 80 which are spaced from each and with insulation 10 between the coil turns and filtering the coil turns. The coil turns 80 have the inner portions exposed for a circumferential length to direct the radiant substantially perpendicular to the vessel wall, as typically shown in FIG. 8. The exposed portion is preferably formed as a flat portion 80a of the coil turn to promote the perpendicular transfer of the energy. The coil 9 is formed into a plurality of parallel runs 84, as shown in FIG. 7. Each run or row 84 extends circumferentially to form parallel spaced rows. The parallel rows 84 are connected at the opposite ends to each other through a special end coil sections or connection having a unique configuration to maintain a uniform temperature pattern applied to the wall of the pot 3 within the limits of the thermal chamber 11.

The alternate ends are similarly interconnected by the end sections 82, each of which is shown consisting of two coil turns connected to the two adjacent rows by bent end wire connectors 84. In a practical coil unit as described below, each end sections included five coil turns. Each end wire connector 84 is conveniently formed by straightening a single loop of the conductor coil and providing a right angle turn at the center of such straightened turn.

As shown in FIG. 5, the separate ends of the embedded coil 9 includes terminals 85 which project outwardly of the corresponding insulating shell 10. The terminals 85 are connected by any suitable connecting means, not shown, to a three phase power supply in accordance with conventional practice. The power supply may be the conventional power distribution system available from the public utilities in the United States, which establishes a sufficient power level for the cooking apparatus in accordance with the necessary specifications.

In the present invention, the power supply required is significantly reduced. A typical requirement would be a 230 volt supply of 6 Kw rating. The particular specifications will be determined by the specific size of the cooking kettle, the desired maximum operating temperature and the time cycle and the like. As such parameters will be readily specified by those skilled in the art, no further description or discussion thereof is given, other than as of significance to the construction and operation of the present invention.

The special construction of the coil 9 establishes a maximum thermal radiation per unit of area without creation of hot spots and/or degradation of the insulation. The insulation lips and thus chamber 11 is specially formed to space the inner surface of the heating unit 8 and particularly exposed coils 9 from the walls of the pot to permit a diffusion of the radiant energy emitted from the heating unit outwardly onto the kettle wall. This is particularly significant in the illustrated structure where the rows are shown in significant spaced relation to each other.

The heating element for example, as disclosed and the previously referred to U.S. patent is formed by vacuum application of the insulation about the heating coil 9, with the outer wall and the lips being formed to a thickness sufficient to effectively prevent any significant loss of thermal energy from the side wall of the heating assembly. In the construction process, the insulation 10 is in the form of fibers of ceramic or other high temperature material. The fibers are vacuum drawn onto and through the coil from the outer surface or side of the coil. In order to provide an adequate insulation about the unit, the coil turns 80 are spaced from each other. The insulation between the adjacent coil turns 80 tends to isolate the several coil turns and maintain continued, long life effective coil operation. The density of the insulation is somewhat less within the coil turns as at 83 than within the shell wall. As a result thereof, the embedded portion of the coil turns, which of course operate at the relatively high temperature of about 800° to 1,000° F., tends to radiate the heat radially inwardly through the coil turns into the air gap to pot 3, thereby providing a more efficient and effective heating source. The coil turns 80 are formed with the flat surfaces facing the pot 3 to properly project the radiant energy for maximum energy transfer. Although one might expect the heating element to be formed with closely spaced coil turns, the inventor found that in fact the coil unit should be formed as an expanding heating unit. Similarly, although it would appear that the coil rows should also be closely spaced to increase the input density per unit of the area, the inventor has discovered that the spacing of the rows is desirable and is selected in relationship to the spacing of the heating unit from the wall to create a diffusion of the radiating energy over the face of the kettle or pot such that the temperature gradient between the source and kettle is significantly minimized.

More particularly, in a practical construction, the coils were formed with about nine evenly spaced turns per inch and a nominal diameter of one half inch. The coil rows 62 were spaced approximately 1¼ths inches apart. The wire was 12 gauge high temperatures heating wire.

The cooker 1 is controlled from a front control panel having various on/off controls, automatic/manual controls, temperature and time controls as well as various visual indicators of the status of the equipment. The controller preferably includes a microprocessor controller to provide automatic timing of the heating, pressure relief of the cooker at the end of the cooking sequence and the like. The actual control system can be readily provided by those skilled in the art and a particular circuit and/or control system is not shown or described in detail. A brief description of a control system based on the illustrated control panel 86 on the front of the cabinet 11 as shown in FIG. 1 is briefly described.

Figure 4:
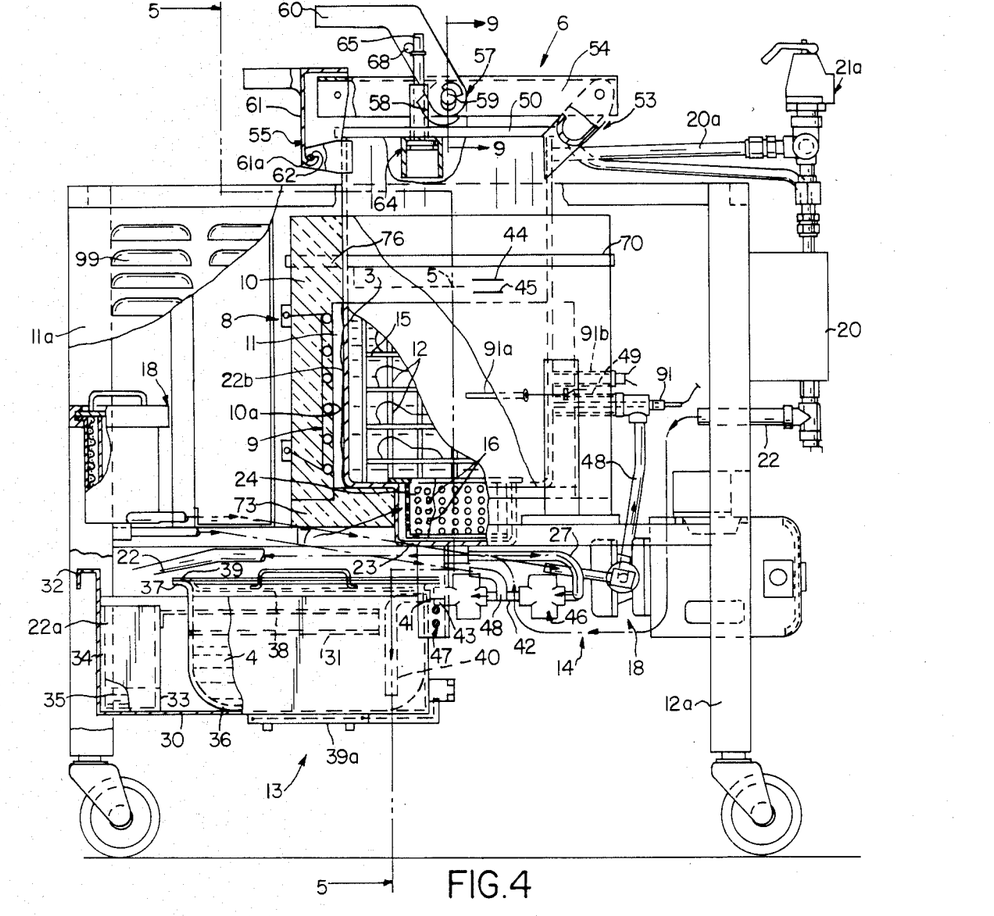
FIG. 4 is an enlarged side view with parts broken away and shown in vertical section of the cooker shown in FIGS. 1-3.

The control system will include a timing control for setting the time of a cooking cycle as well as a cooking temperature control. The control panel is shown with a cooking time display and control panel 87 and a separate similar temperature display and control panel 88. Each panel is provided with a similar digital display 89, as well as a pair of control buttons 90 for raising and lowering of the respective parimeters. The system preferably includes means to continuously monitor the system temperature. As shown in FIG. 4, a plurality of separate temperatures sensing units of any suitable construction include a pot oil sensor 91 in the oil inlet pipe 49, a chamber sensor 91a mounted in insulator 10 and extending into the chamber 11 and as an oil limit sensor 91b. The sensor 91 is used to heat the oil and hold the oil at the cooking temperature within close limits such as ±5° F. while the chamber sensor 91a limits the temperature therein and the coil sensor 91b responds to an abnormal oil temperature to shut down to the cooker. The temperature control would of course be connected into a controlled program such as a programmable controller, with the oil temperature sensors, the thermal chamber sensor, and the inlet temperature sensor. The control would monitor and maintain the desired constant oil temperature for cooking. In addition, the temperature in the transfer chamber and/or the inlet pipe would be monitored to energize the heating elements 9 to maintain a minimum thermal chamber temperature and thereby proper oil temperature.

The timer system would be interconnected to cycle the system for a predetermined time with a display of the remaining time in the cycle. At the end of the cycle, the heating unit 9 would be de-energized and the solenoid pressure release valve energized to relief the pressure in the pot 3 and thereby condition the system for opening of the cover. Appropriate signal lights will normally be provided to indicate the status, namely, when the cooking cycle is in process and when the cooking cycle has ended and the cover unit may be safely removed.

In addition, a manual control is provided for selectively establishing the particular operating mode as well as for turning the system off. The illustrated manual control is shown including a rotating dial knob 92 settable in five different position, including a central off position 93. To the left of the off position a fill position 44 and a cook position is provided. In the fill position, the system operates the pump unit 21 to transfer oil from the reservoir unit to the pot 3 with the fine filtering of the oil provided by the fine filter unit. In the cook position, the processor is actuated to provide the automatic, timed cooking of the chicken and release of pressure at the end of the cycle.

To the right side of the off position 93, a drain position 96 and filter position 97 are shown. In the drain position, the two solenoids 45 and 46 are energized and the oil is transmitted directly to the reservoir for storage. In the filter position, the control system only opens valve 46 and provides for the circulater of the oil from the pot 3 through the dual filtering as provided by the prefilter unit 17 and the final filter unit 18 to thoroughly clean the cooking oil 4.

In accordance with one sequence with the present invention, the oil is introduced into the reservoir either in liquid or solid form. If solid oil is used, the heating element is energized to melt, the oil preferably at somewhat reduced temperature, and establish the desired liquid level in the kettle. The cover is secured to the pot and the heating elements are energized. The oil is then heated to the desired level, generally corresponding to the maximum cooking temperature. Although, typical requirements of present day cookers are in the range of at least 350 degrees Fahrenheit, the present inventor is of the opinion and prefers to operate the cooking apparatus at a maximum temperature in the range of 300 to 335 degrees Fahrenheit. The lower temperature and cooking time is accepted in a practical commercial production with the present cooker and the inventor has found that a 335° F. provides a completely and thoroughly cooked product without discoloration and with an acceptable cooking period. The reduction in temperature from the more standard temperature of 350° F. to 400° F. results in a very significant improvement in the life of the oil by preventing degradation of the characteristic of the cooking oil as well as lower energy costs.

In any event, with the oil at the cooking temperature, the pot 3 is opened and a filled basket of the food product such as breaded chicken is introduced, with the oil 4 rising upwardly over the uppermost layer of the food product. Thus, the maximum and minimum oil levels are selected to ensure coverage of the cooking product, subject to proper placement of the product with partial loads. The oil level remains in significant spaced relation to the cover, and generally in the portion of the kettle aligned with the upper lip of the insulating shell 10. The cold food tends to cool the cooking oil. The heating unit 8 is energized during essentially the total cooking cycle to maintain the radiant heat on the pot 3 and prevent the temperature of the oil from dropping below a selected level. As a result of the heating, the cooking oil 4 is again rapidly heated to the desired cooking level and held at a cooking level for a selected time, usually until the last minute of the cooking cycle. At the end of such time, the heating element is deenergized and the unit is allowed to continue cooking with the cover in the closed position. During this period, the pot 3 and the ceramic insulation 10 is a heat sink which maintains a controlled supply of heat on the oil 4. The temperature of the oil is thus allowed to drop only slightly during the continued cooking cycle. The chicken, or other food product, continues to cook during this time which is selected to thoroughly cook the product.

For example, a total cooking cycle for breaded chicken beginning with the introduction of the filled basket into the oil to the time of its removal may require approximately 12 minutes. The heating element is energized for 11 minutes, which is a sufficient period to heat the unit and establish a desired cooking temperature. The unit is allowed to cook for the 11 minutes, after which the heating unit 8 is de-energized and the cooking continues with the thermal energy supply derived solely from the energy stored in the heat sink for a period of one minute.

At the end of the cooking cycle, the pressure valve opens to relieve the pressure in pot 3 and cover unit 6 is opened, the basket of cooked chicken is lifted from the pot and held over the top such that excess oil drains back into the oil bath. The draining period is in the order of two minutes. During this period all excess oil returns into the pot to minimize the replacement. Further, during such period, a filtering cycle may be carried but during which the oil is passed through the coarse filter and the fine filter, or the oil may be drained to reservoir for cleaning of the coarse filter basket, and subsequent filling of the pot.

A certain amount of the cooking oil is absorbed into the product, and of course is periodically replaced. The replacement of course will be done on a periodic or continuous batch basis depending upon the operator selection. Although any control system may be used, a manual control valve is shown.

After suitable dripping of the oil and after removal of the excess oil, the basket is moved for removal of the product and a second basket prefilled with cold product is simultaneously moved into operating position over the kettle and cooking oil. The cycle is then repeated by lowering of the basket into the cooking oil, closing of the cooker and energy of the heating element.

Figure 3:
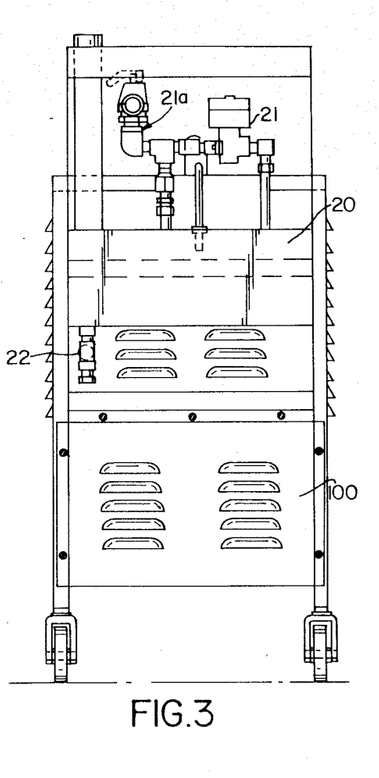
FIG. 3 is a rear elevational view of the cooker shown in FIGS. 1 and 2.

As shown in FIGS. 1-3, the cabinet 11a is specially constructed with the upper portions of the two cabinet side walls and the back wall with similar downward louvers 99 to limit build up of heat around the cooking pot and heating unit. The rear of the cabinet including a bottom louver wall 100 adjacent the pump unit 18, with the lower portion of the side walls and front wall are continuous wall which tend to retain the low level heat about the reservoir unit 13 and the piping system. A front access door 101 is provided beneath control panel 87 for access to the heating unit 8 and various control components. A cutoff switch 102 is located behind door 101 to shut down the cooker when the door is open including opening the door during a cooking cycle.

Although the present invention has been described with the pressurized cooking system, the structure may be used as a non-pressurized cooking unit.

The present invention thus provides a significant improvement in the practical application of the deep cooking apparatus and particularly in the combination of the unique elongated cooking pot and the special radiant heating assembly consisting of the embedded but exposed coils to produce rapid, efficient heating of the oil and permitting the low temperature functioning, with the resulting significant decrease in both the oil consumption and the total energy consumption.

Various modes of carrying out the invention are contemplated as being within the scope of the following claims particularly pointing out and distinctly claiming the subject matter which is regarded as the invention.

I claim:

1. A pressurized deep oil cooker comprising
an elongated cooking pot formed of a heat transmitting material and having a removable cover means, said pot being adapted to contain a cooking oil at a selected cooking temperature,
radiant heater means spaced from said cooking pot for heating of said cooking pot by radiant energy, and
a thermal insulating jacket encircling said heater means and having a side wall spaced from said pot and opposite end walls projecting inwardly abutting engagement with said pot and defining a transfer chamber between the jacket and the outer wall of said pot and operable to establish a heat level substantially greater than the selected cooking temperature and thereby heating the pot and oil in said pot, said thermal insulating jacket including a high temperature insulation having an inner surface of said side wall spaced from and directly exposed to said outer wall of said pot, said radiant heater means including a high temperature spiral wound coil having a plurality of coil turns, said coil being wound about said pot and spaced along the length of the pot to establish an essentially uniform heat input to said chamber and said coil turns embedded within said insulation and directly engaging said insulation with insulation filling the coil turns and having said coil turns exposed only at the inner surface of said insulation, and
control means to energize said heater means and raise the temperature in said chamber and of said pot and thereby raise the temperature of the cooking liquid to a preselected uniform cooking temperature.

2. The cooker of claim 1 wherein heating means is a spiral wound coil embedded in said insulation with small portions of the coil turns exposed at the inner wall of said chamber, said exposed portion of said coil turns being substantially flat to extend substantially parallel to the pot.

3. The cooker of claim 1 wherein said cooking pot includes a bottom wall and a cylindrical side wall, said pot having a length to width ratio of at least 1.8 to 1 and having a maximum oil capacity of about one half the length of the pot, whereby said cooking pot is adapted to receive substantially one pound of food product to 1.8 pounds of cooking oil.

4. The cooker of claim 1 wherein said chamber encircling said pot is substantially aligned with the minimum oil level of said cooking oil in said pot.

5. The cooker of claim 1 having a collection filter chamber secured to the center of the bottom wall of said pot and projecting downwardly therefrom, said collection chamber having a diameter approximately equal to one half the diameter of the cooking pot.

6. The cooker of claim 1 wherein said insulating jacket includes an L-shaped member having a top leg portion abutting the top wall portion of said pot and an outwardly spaced leg portion extending downwardly to below the bottom of said pot, and a and extending outwardly into overlapping sealed engagement with said vertical leg to define said thermal insulating jacket.

7. The cooker of claim 1 wherein said insulating jacket includes a plurality of corresponding circumferential sections and each circumferential section encompasses the same circumferential degrees.

8. The cooker of claim 7 wherein said heating means including a separate electrical coil unit formed of a spiral wound wire for each of said sections, said coil unit being embedded within the inner face wall of each corresponding section and having terminals extending through said insulating jacket and terminating in connecting terminals, each of said sections providing a separate power phase connection.

9. The cooking apparatus of claim 1 wherein said coil rows extend circumferentially of said pot and said rows are vertically distributed within said jacket, the opposite ends of said coil rows being interconnected by integral connecting end sections, each end sections consisting of a plurality of coil turns and integral right angle connecting wire interconnecting the end turn of each coil row to an end turn of the adjacent end section.

10. The cooker of claim 1 for batch cooking multiple parts of chicken or the like including oil in said pot between a selected minimum and maximum oil substantially spaced from the top end of the pot and defining a free space between said cover means and said maximum oil level, said coil having an upper end below the selected minimum oil level, and said insulation surrounding the exterior and upper end of said heating unit substantially restricting transmission of radiant energy to the cooking pot below the selection minimum oil level, and control means to operate said heating unit to hold said oil at a substantially constant temperature in the range of 300° F. to 335° F. during the cooking cycle.

11. The deep cooker apparatus of claim 10 wherein said pot has a diameter of substantially 10 inches in diameter and a height of substantially 18 inches, said selected maximum oil level being substantially 9 inches.

12. The cooking apparatus of claim 1 wherein said insulation is a solid vacuum cast insulation having said spiral coil embedded within the inner face of said recess, said high temperature compacted insulation having a greater density in the portion of the insulation to the radially outer side of said embedded heating coil turns than within the coil turns whereby the heat in the coil within the insulation more readily moves outwardly into said heating chamber then through the outer insulation.

13. The cooking apparatus of claim 1 including an outer cabinet having an upper wall structure, said cooking pot being mounted within said upper wall with an upper portion of said cooking pot projecting upwardly above said upper wall, an oil reservoir secured within said housing beneath said cooking pot and being essentially closed, said reservoir including a removable cover means for introduction of cooking oil, heating means associated with said reservoir for maintaining of the cooking oil in an essentially liquid state, said reservoir being substantially sealed to minimize interchange of air and oxidation of the oil within said reservoir, said cooking oil in said reservoir being held at a relatively low temperature to minimize oxidation thereof, an oil filter and recycling means system including a filter line connected between the bottom of said cooking pot and said reservoir and including a first filter means for removal of foreign particles from said oil, and a return line connected between said reservoir and said cooking pot for transfer of oil from said reservoir to said cooking pot, and including a fine filter connected whereby oil returned to said reservoir is essentially completely free of contaminant product and thereby completing an essentially closed filter system.

* * * * *

UNITED STATES PATENT AND TRADEMARK OFFICE
CERTIFICATE OF CORRECTION

PATENT NO. : 4,798,939
DATED : January 17, 1989
INVENTOR(S) : Louis Nett

It is certified that error appears in the above-identified patent and that said Letters Patent is hereby corrected as shown below:

IN THE CLAIMS: Col. 20, line 8, after "inwardly" insert ---into---; Col. 20, line 56, after "a" insert ---bottom closure member abutting the bottom of said pot ---.

Col. 21, line 12, after "like" insert -- , --.

Signed and Sealed this

Twenty-fourth Day of October, 1989

Attest:

DONALD J. QUIGG

Attesting Officer

Commissioner of Patents and Trademarks